United States Patent Office 3,430,756
Patented Mar. 4, 1969

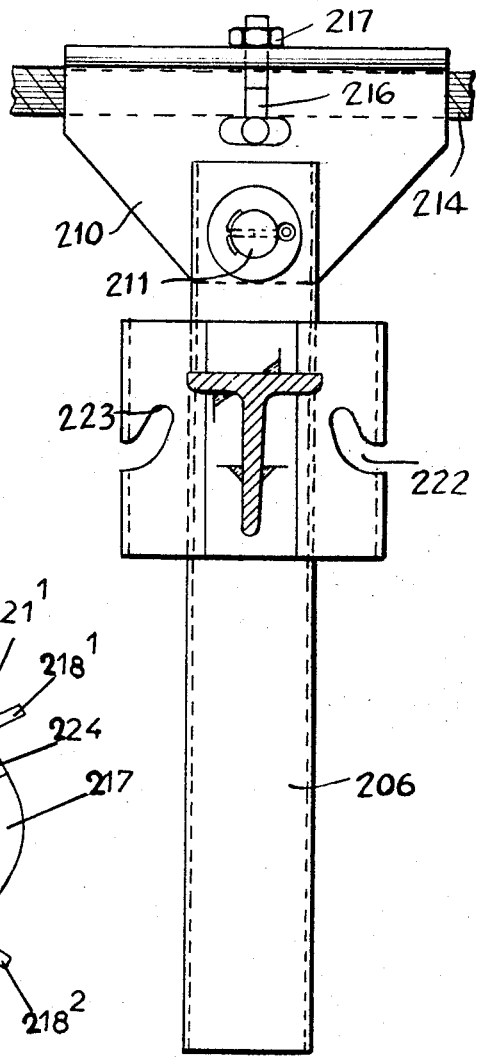
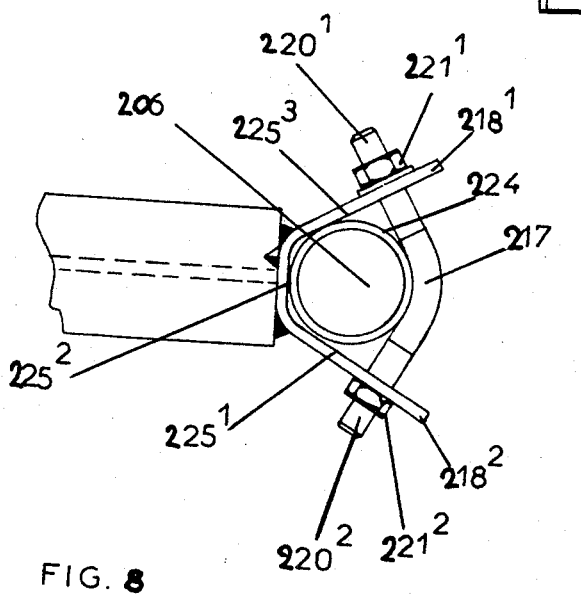
FIG 7
FIG. 8

3,430,756
STRUCTURE FOR CONNECTING THE ENDS OF A TROUGHING ROLL ASSEMBLY
Marcel Allendorf, Saverne, France, assignor to Precismeca S.A., Saverne, France, a company of France
Filed June 16, 1967, Ser. No. 646,578
Claims priority, application France, July 5, 1966, 68,258
U.S. Cl. 198—192
Int. Cl. B65g 15/08
2 Claims

ABSTRACT OF THE DISCLOSURE

Structure for connecting the ends of a troughing roll assembly having a conveying train comprising a plurality of assemblies of horizontal rolls and inclined side rolls and having means for placing the longitudinal wire ropes under the inclined rolls of the assembly of rolls.

---

According to one characteristic of the invention the means are suspension elements having at their lower end housings for the wire ropes.

According to another characteristic of the invention the suspending elements have a series of openings for levelling the loaded belt.

According to another characteristic of the invention, means are provided for progressively and precisely adjusting the height of the various assemblies of the conveyor in order to put the working loaded part of the belt in a rectilinear plane.

According to another characteristic of the invention the means are threaded stems along which slide elements supporting the various assemblies.

According to still another characteristic of the invention the supporting elements have threaded female elements holding the end of the assemblies.

According to another characteristic of the invention, the threaded stems have hooking elements permitting to secure the assemblies to the longitudinal wire ropes.

According to another characteristic of the invention, fastening means are provided at the side ends of the intermediate assemblies with single/double train of rolls to hook the assemblies by making the securing means rest on the longitudinal wire ropes forming the frame of the conveyor.

According to still another characteristic of the invention the intermediate assemblies with simple or double train of rolls comprise adjusting elements ensuring a very precise adjustment of position to give the desired height to the assembly.

The invention extends to the characteristics above mentioned and to their various possible combinations.

The invention will be better understood by referring to the following description made by way of non-limiting example and to the accompanying drawings in which:

FIGURE 7 is an end view taken along cross section A—A of FIGURE 6.

FIGURE 8 is an underneath view taken along cross section B—B of FIGURE 6.

Figure 1:
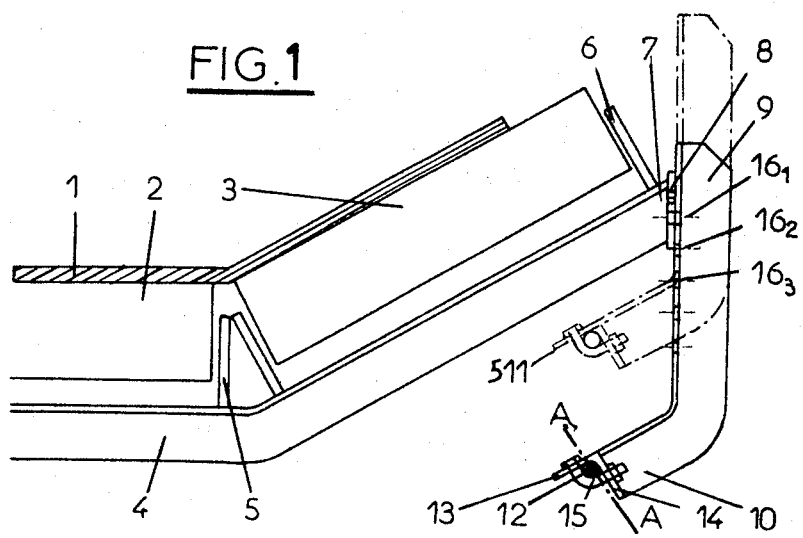
FIGURE 1 is a front elevational view of an upper assembly according to the invention.

Referring to FIGURE 1, the conveyor belt 1 moves on horizontal rolls 2 and inclined rolls 3.

Horizontal rolls 2 and inclined rolls 3 are mounted on a cross brace 4 on bearings 5 and 6.

Support 4 has at its extremities 7 a plate 8 coming to bear against suspending bracket 9.

Suspending bracket 9 has at its extremity 10 a housing for a cable 11. This cable housing 11 which has the shape of a T surmounts cable 12 braced between wings 13 and 14 of housing 11.

Curvilinear clamping elements 15 grips cable 12 and prevents the separation of cable 12 and housing 11.

In order to adjust the height, there are provided in suspending bracket 9 several openings $16_1$, $16_2$, $16_3$, permitting the passage of elements 17 securing plate 8 on suspending bracket 9. To make possible an additional intermediate adjustment, there are made in suspending element 9 several openings.

Figure 2:
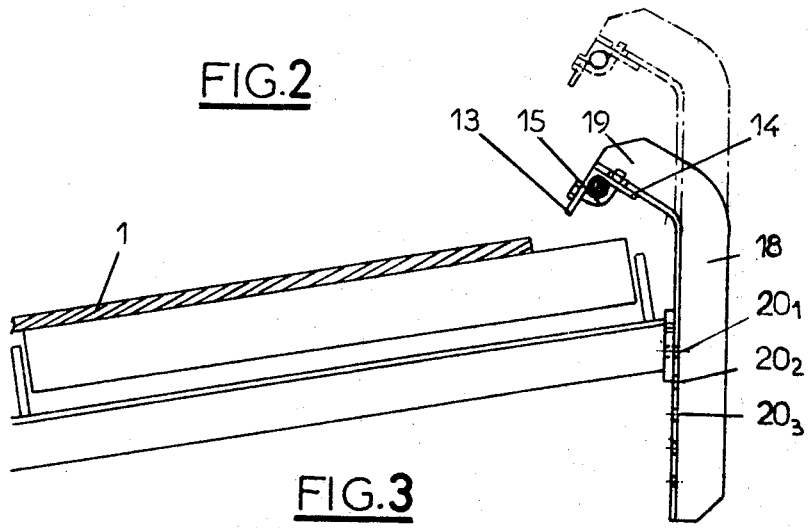
FIGURE 2 is the same for a lower assembly.
Figure 3:
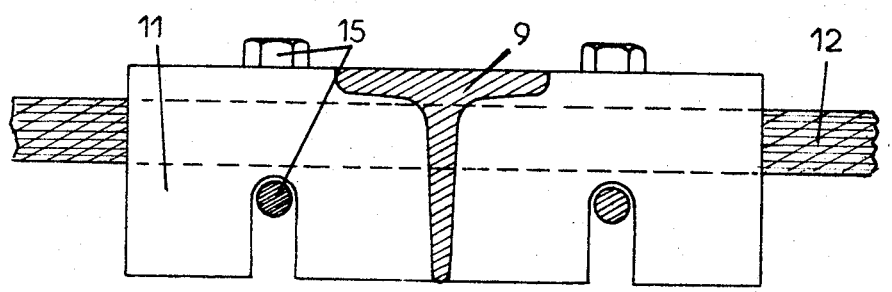
FIGURE 3 is a cross-sectional view taken along line A—A of FIGURE 1.

The lower assembly, see FIGURE 2, comprises suspending brackets 18 having at their curved upper end 19 a housing for cable 11. These suspending brackets 18 also have a series of openings $20_1$, $20_2$, $20_3$, which permits to move away and bring closer the lower assembly of longitudinal wire ropes 11.

By intersecting longitudinal wire ropes $1_2$ between the upper and lower assemblies, there is avoided that the materials moved on the conveyor belt 1 come to place themselves between the inclined rolls 3 and said wire ropes $1_2$ and deteriorate either the wire ropes or the rolls, or the conveyor belt.

This arrangement places the centre of gravity of the material slightly above the supporting wire ropes which has the advantage of practically eliminating all lift and at the same time improves the security of the device by preventing movement of the belt.

Figure 4:
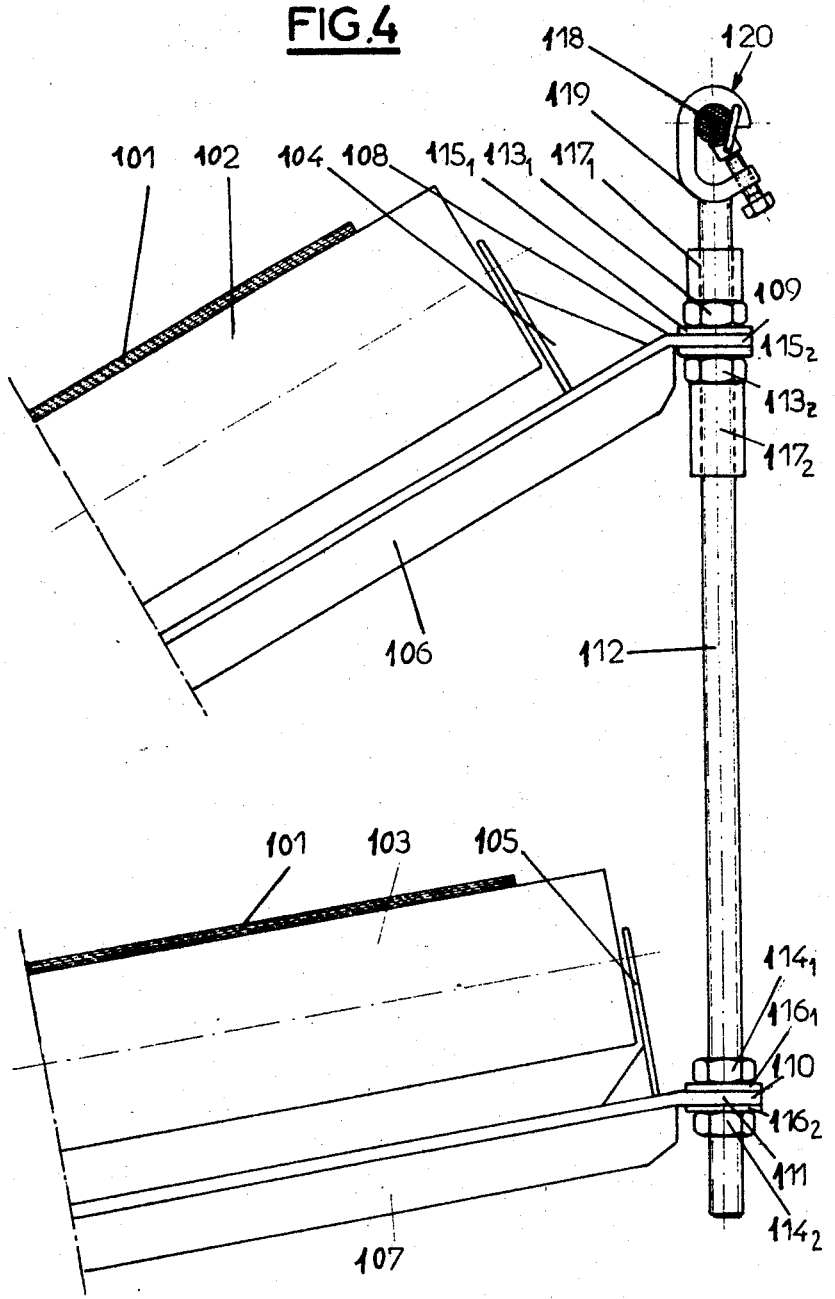
FIGURE 4 is a front elevational view of an assembly with the double rollers provided with adjusting means according to the invention.

Referring to FIGURE 4, the conveyor belt 101 moves on upper rollers 102 and on lower rollers 103. These rollers 102 and 103 are rigid with support 106 and 107 through bearings 104 and 105.

Supports 106 and 107 have at their end 108 foot members 109 and 110. These feet 109 and 110 have an opening 111 through which is engaged a threaded rod 112.

To adjust the height of the different assemblies, the feet 109 and 110 are fixed by securing elements such as nut $113_1$, $113_2$ and $114_1$, $114_2$. Washers $115_1$, $115_2$ and $116_1$, $116_2$ are interposed between nuts $113_1$, $113_2$ respectively $114_1$, $114_2$ and feet 109 and 110, which permits the turning of the assemblies without untightening the various screws or nuts.

To avoid that any material transported overflowing the conveyor belt 101 damages the threaded rods 112, the upper nuts $113_1$, $113_2$ are equipped with stay $117_1$, $117_2$ protecting the threads of the threaded rods 112.

Figure 5:
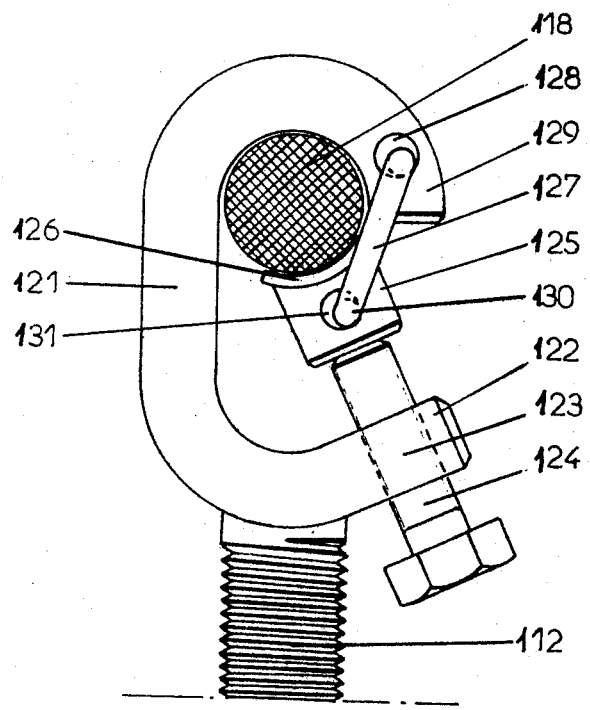
FIGURE 5 is a cross sectional view showing the device for hooking the adjusting means to the wire ropes.

To hook the threaded rods 112 to the longitudinal wire ropes 118, there are mounted in the upper part 119 of said threaded rods 112 a securing device 120 which is shown on FIGURE 5.

The securing device 120 has an open hook 121. The lower part 122 of hook 121 is flared out. There is made in this flared out part 122 a threaded opening 123 through which is screwed a securing element such as a screw.

This securing element 124 applies against the longitudinal wire ropes 118 in retaining shoe 125 having a curvilinear portion 126. By interposing between the securing element 124 and the longitudinal wire rope 118 the retaining shoe 125 there is avoided the crushing of cable 118 by securing element 124.

Furthermore by giving to segment 126 a curvilinear shape, the contacting surface is increased, which permits to improve the securing and the maintenance of the threaded rods 112.

To prevent the rotation of the retaining shoe 125 during the helical rotation of securing element 124, shoe 125 is retained by a spur 127. Spur 127 passes through an orifice 128 made in the hooking foot 129 of open hook 121. The extremities 130 of spur 127 are engaged in an opening 131 made in the retaining shoe 125.

To secure the threaded rod 112 on the longitudinal cable 118, cable 118 is placed in the hooking foot 129. Shoe 125 is bent back by means of spur 127 around opening 128 and applied against cable 118. Shoe 125 is kept against cable 118 by tightening securing element 124.

Figure 6:
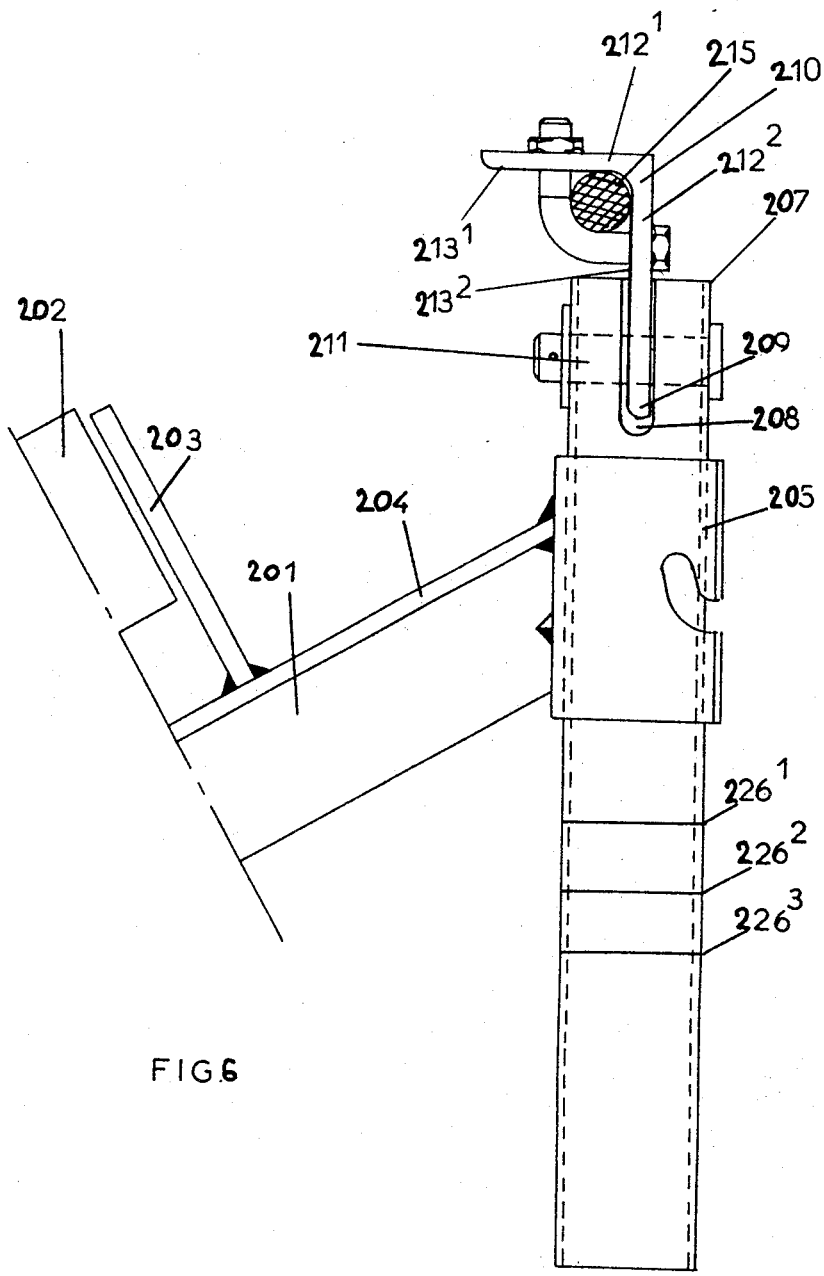
FIGURE 6 is a transversal view of an intermediate assembly having securing means in accordance with the invention.

Reference is made to FIGURE 6. Intermediate assembly 201 provided with rollers 202 secured by supports 203 has at its extremity 204 a sleeve 205.

This sleeve 205 slides along a vertical tubular upright 206. In the upper end 207 of upright 206 is made a recess 208. There is engaged in this recess 208 the lower end 209 of a hooking element 210.

A pivot pin 211 links upright 206 with hooking element 210.

Hooking element 210 has two wings $212_1$ and $212_2$ perpendicular one to the other. The inner surfaces $213_1$ and $213_2$ of wings $212_1$ and $212_2$ hold the longitudinal wire rope 214 which bears against the shell 215 of hooking element 210.

To eliminate sliding of assembly 201 on wire rope 214 hooking element 210 is provided with a stirrup 216 which grips wire rope 214 against the inner surfaces $213_1$ and $213_2$ of wings $212_1$ and $212_2$. Stirrup 216 can for example be a bent bolt. To maintain assembly 201 it suffices to tighten nut 217 which makes possible a very rapid assembly and attachment (see FIGURE 7).

Sleeve 205 consists of two lateral feet $218_1$ and $218_2$ surrounding upright 206. A traction is exerted on said lateral feet $218_1$ and $218_2$ by the intermediary of at least one brace 219. Brace 219 has threaded ends $220_1$ and $220_2$ on which are screwed tightening elements $221_1$ and $221_2$.

Notches 222 are made in lateral feet $218_1$ and $218_2$ such that bottom 223 of said notches 222 serve as a housing for brace 219. On its own weight, assembly 201 exerts a traction effect on tie rod 219 but owing to the adherence between, on the one hand, the outer surface 224 of bracket 206, and, on the other hand, the inner surfaces $225_1$, $225_2$, and $225_3$ of sleeve 205 respectively of brace 219, all sliding towards the bottom of assembly 201 is eliminated (see FIGURE 8).

Positioning indices $226_1$, $226_2$ are made on upright 206 to facilitate the leveling of assembly 201 relative to the working and of the conveyor belt.

Although the invention has been described with respect to certain particular modifications thereof, it will be understood that the same is in no way limited thereto and there can be brought to it various modifications of shapes and materials without thereby departing from the framework and the spirit of the invention.

What is claimed is:

1. In combination in a structure for connecting the end of at least one troughing roll assembly comprising a pair of wing rollers flanking one or more inner rollers mounted on a cross brace suspended from a pair of flexible wire ropes trained along a conveying course over which runs a conveying belt, and a suspending bracket consisting of a threaded rod having at the upper extremity thereof means for securing said rod to one of said wire ropes, said means including an open hook having an outwardly flaring lower extremity and a curved upper part, a retaining shoe adapted to secure said wire rope against said curved upper part, said shoe being adjustably secured to said lower extremity of said hook, and a stirrup securing said shoe to said curved upper part of said hook; said rod having a pair of nuts screwed thereto; said crossbrace having a foot mounted on said rod between said nuts for adjustably securing said crossbrace to said end thereby adjusting the lead of said belt.

2. Structure according to claim 1, wherein said lower extremity of said hook has a screw threaded therein and connected to said shoe for moving the same.

References Cited

UNITED STATES PATENTS

| 3,105,586 | 10/1963 | Carew | 198—64 |
| 3,191,760 | 6/1965 | Herzog | 198—192 |
| 3,219,174 | 11/1965 | Eckhardt | 198—192 |

FOREIGN PATENTS

| 1,221,137 | 9/1964 | Germany. |

RICHARD E. AEGERTER, *Primary Examiner.*